Aug. 18, 1959
H. S. FEGELY ET AL
2,900,628
MULTIPLE FAULT INDICATING SYSTEM
Filed Jan. 27, 1956
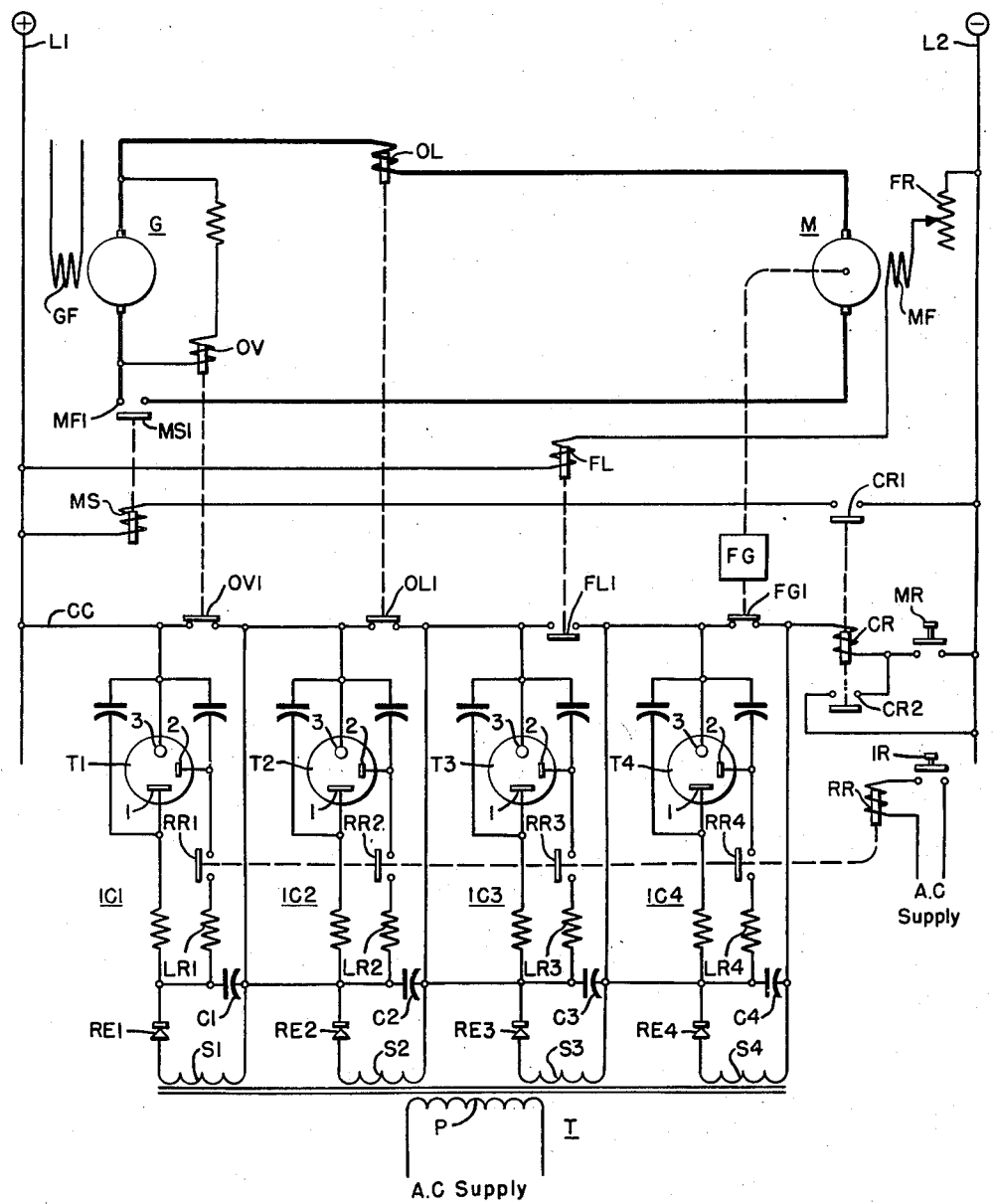
WITNESSES:
INVENTORS
Hugh S. Fegely and
Hubert W. Van Ness.
BY
ATTORNEY United States Patent Office 2,900,628
Patented Aug. 18, 1959

2,900,628

MULTIPLE FAULT INDICATING SYSTEM

Hugh S. Fegely, Buffalo, N.Y., and Hubert W. Van Ness, Diablo, Calif., assignors to Westinghouse Electric Corporation, East Pittsburgh, Pa., a corporation of Pennsylvania Application January 27, 1956, Serial No. 561,778

3 Claims. (Cl. 340—213)

This invention relates generally to indicating systems and, more particularly, to multiple fault indicating systems of this type which are useful in connection with electrical fault protection arrangements wherein the indicator system indicates the faulty circuit and remembers the fault circuit.

Some previous multiple fault indicating systems indicating circuits, controlled by the contacts of separate fault responsive switching devices for indicating the source of a fault in the main electrical system. The arrangement provides a control circuit having the contacts of the respective fault responsive devices connected in series therein and the glow tubes are connected in parallel between the respective contacts across the control circuits supply of voltage. Thus, the glow tubes depend upon and are energized by control circuit voltage. Consequently, the opening of a single contact in the control circuit interrupts the voltage to all the tubes connected between the opened contact and the common side of the control voltage. Thus, depending upon the location of the opened contact in the control voltage circuit, the number of tubes extinguished by the opening of a single fault responsive contact in the control circuit will vary, depending upon the opened contacts position in the series chain, from one tube to all of the tubes.

It is an object of this invention to provide a multiple fault indicating system of the character referred to wherein a single fault responsive control contact controls a single indicating circuit and is ineffective to control other indicating circuits.

More specifically stated, it is an object of this invention to provide a fault responsive indicating system comprising separately energized indicating circuits controlled by separate fault responsive control contacts.

The foregoing statements are merely illustrative of the various aims and objects of this invention. Other objects and advantages will become apparent from a study of the following disclosure when considered in conjunction with the accompanying drawing, in which the single figure thereof diagrammatically illustrates the application of an indicating system embodying the principles of this invention.

The indicating system is applied in this instance, for illustrative purposes only, to indicate fault conditions in a conventional direct current variable voltage drive. The drive arrangement conventionally includes a direct current generator G and a direct current motor M. The armatures of the generator and motor are connected in a series loop. The generator is provided with a separately excited field winding designated GF. The manner in which this winding is excited is not indicated in the interest of simplicity since the excitation system therefor forms no part of this invention. The motor is provided with a separately excited field winding designated MF. This winding is adapted for excitation from a suitable supply of direct current which may, for example, be the direct current supply represented by the conductors designated L1 and L2 in the drawing. The degree of excitation of the motor field winding may be controlled by a field rheostat FR which may be manually or automatically adjusted.

Drives of this type usually require protection against overload currents, overvoltage, overspeed and loss of motor field, to mention a few of the conditions. In such arrangements, it is convenient to provide a control circuit wherein the contacts of suitable electromagnetically operated fault responsive devices may be connected in series to control a suitable control relay or contactor of some sort, whereby the circuit between the motor and generator armatures may be opened to prevent damage to the system. In the present case the control circuit comprises the contacts of an overvoltage relay OV, the contacts of an overload relay OL, the contacts of a field loss relay FL and the contacts of a speed responsive device driven by the motor, for example, a flyball governor designated FG. These contacts are respectively designated OV1, OL1, FL1 and FG1. These series connected contacts control a control delay designated CR, the coil of which is connected across the supply of direct current voltage. A manually operated control reset switch MR, which is normally open, is also connected in series in this circuit and is utilized to initiate starting of the system whenever the contacts of all the series connected fault responsive devices are closed. The control relay CR, as indicated, is provided with a set of contacts CR1 in the coil circuit of a main switch or contactor MS connected across the supply of direct current. This contactor may be of a sufficiently heavy duty type so that its contacts MS1 are capable of interrupting the currents existing in the motor and generator armature circuits. Alternatively, if conditions permit, the contacts of a control relay such as CR may be utilized directly to control the opening and closing of the circuit which is to be protected.

The indicating system comprises a plurality of separate indicating circuits IC1, IC2, IC3 and IC4 which are respectively connected to include the respective contacts OV1, OL1, FL1 and FG1 in series therein. Separate power supplies are provided for the respective indicating circuits. These power supplies produce direct current voltage for energizing the respective indicator circuits. The arrangement herein illustrated comprises a transformer generally designated T having a primary P adapted for connection to a suitable supply of alternating current and having respective secondary windings S1 through S4 connected to the respective indicator circuits. Half-wave rectification of the secondary winding voltages of the transformer T for the individual indicator circuits is provided by respective series connected rectifiers RE1 through RE4. Each indicator circuit is provided with a gas filled electronic glow tube of which the type OA4G is typical. Each tube has a main anode 1, a starting electrode or anode 2 and a cathode 3. The main anode and cathode, in each case, are connected across the half-wave supply of direct current represented in the charge appearing across the respective capacitors C1 through C4 in the respective indicator circuits. The anode 2 in each case is connected across the direct current supply by means of respective reset relay contacts RR1 through RR4, which are connected between the starting electrodes or anodes 2 and respective limiting resistors LR1 through LR4 to the positive terminal of the direct current supply. The reset relay contacts are normally open and thus no starting voltage is supplied to the starting anodes.

The coil of the reset relay is connected across a suitable supply of alternating current by means of an indicator reset switch IR which is connected in series with the coil of the reset relay. If convenient, as in this case, the switch IR may be used to connect reset relay RR across the alternating current supply circuit shown. Closure of switch IR energizes the reset relay which simultaneously closes all of its contacts, thereby simultaneously energizing all of the starting electrode circuits of the respective glow tubes T1 through T4 to initiate firing of these tubes.

With the arrangement illustrated, assuming that the primary winding P of transformer T is connected to a suitable supply of alternating current, the application of direct current to the positive and negative conductors L1 and L2 results in energization of the field loss relay FL which is in series with the motor field. Energization of these direct current conductors, of course, applies the field to the motor M. Upon energization of the field loss relay FL, the normally open contacts FL1 in the series control circuit now close so that the contacts of all the fault responsive devices in series in the control circuit are closed. Next, the manually operated control reset switch MR is depressed which closes the control relay circuit, thereby energizing the control relay CR which closes its contacts CR1 in series with the coil of the main contactor MS and completes a holding circuit for itself at its contacts CR2, which parallels the manually operated control reset switch MR. Upon energization of the main contactor MS, the contacts MS1 thereof are closed to complete the circuit between the armatures of the motor and generator. Thus, upon application of field to the generator the motor may be controlled in any suitable manner.

To initiate operation of the indicating system, the indicating reset switch IR is closed. This energizes the reset relay RR which closes all of its contacts RR1 through RR4 in the starting electrode or anode circuits of the respective glow tubes T1 through T4. Thus, all of the glow tubes are fired and continue to conduct when the reset relay is deenergized through release of the indicator reset switch IR.

Upon occurrence of any one of, overvoltage, overload current, loss of motor field or motor overspeed, the corresponding one of the series connected control contacts will be opened. The opening of any one of these contacts immediately opens the associated indicator circuit, and the glow tube in that circuit ceases to conduct. Thus, the tube goes out and indicates which of the protective devices in the variable voltage drive operate. Opening any of any one of the series connected control contacts, of course, deenergizes the control relay CR, which in turn deenergizes the main contactor MS to disconnect the motor from the generator. The system may be started again by depressing the control reset CR which again picks up the control relay to energize and close the main contactor. However, the glow tube in the indicator circuit which was controlled by the fault responsive control relay remains dark and will not begin conducting until the indicator reset switch IR is closed to momentarily close the reset relay RR. When this happens, the starting electrode of the dark tube is again energized and consequently this tube fires and remains conducting again as long as its associated control contacts remain closed. Although energization of the reset relay again connects the starting electrodes of the remaining tubes which are conducting to their respective direct current sources, it will be appreciated that this has no effect upon the conducting tubes. By connecting control voltage to the indicating circuits so that positive polarity is applied to the cathodes of the glow tubes, inadvertent tube firing is prevented.

It will be appreciated from the foregoing that the respective indicator circuits are controlled only by their respective control contacts, and, that by reason of the provision of separate direct current power supplies, which may be batteries, tube rectifiers, etc., for the respective indicator circuits, the interruption of current in the control circuit CC by opening of any one of the series connected control contacts, in no way affects any other indicator circuit excepting that with which it is directly connected. Thus, the indicating system is capable of precisely indicating which one of the fault responsive control contacts is open, which pin points the faulted condition. Moreover, if more than one of the fault responsive control contacts had opened, this would also have been positively indicated, again in view of the fact, that the respective contacts are capable only of affecting the indicating circuits with which they are connected.

Although but one embodiment of this invention has been illustrated herein, it will be appreciated by those skilled in the art that this invention both in its details and in the organization of such details is susceptible of modification without departing from the spirit and scope of the invention. Accordingly, it is intended that the foregoing disclosure and the showing made in the drawing shall be construed as illustrative of the principles of this invention and not interpreted in a limiting sense.

We claim as our invention:

1. A multiple fault indicating system comprising, a control circuit having a plurality of switches connected in series therein and adapted to have a direct current voltage applied thereto, a plurality of electronic tubes, one for each switch, each having an anode, a cathode and a starting electrode; direct current supply circuit means separate from the direct current voltage applied to said control circuit, individual circuits each including a respective one of said plurality of switches in series therein and connecting the anode and cathode of a respective one of said plurality of tubes across said direct current supply circuit means, and switching means connecting said starting electrodes to said supply circuit means for starting conduction of said tubes.

2. A multiple fault indicating system comprising, a control circuit having a plurality of switches connected in series therein and adapted to have a direct current voltage applied thereto, a plurality of electronic tubes, one for each switch, each having an anode, a cathode and a starting electrode, direct current supply circuit means separate from the direct current voltage applied to said control circuit, individual circuits each including a respective one of said plurality of switches in series therein and connecting the anode and cathode of a respective one of said plurality of tubes across said direct current supply circuit means, a plurality of starting electrode switches each connected between a starting electrode of a respective one of said tubes and said direct current supply circuit means, said starting electrode switches being normally open, and means operatively connected with said starting electrode switches for temporarily closing the starting electrode switches and initiating conduction of said tubes.

3. A multiple fault indicating system comprising, a control circuit having a plurality of switches connected in series therein, respective indicating circuits connected with said respective switches to be controlled thereby, respective glow tubes having anodes and cathodes connected in said respective indicating circuits and each having a starting electrode, separate power supply means connected in each one of said indicating circuits, a separate normally open switch connected between each said starting electrode and the corresponding power supply means, and means for simultaneously closing all said normally open switches.

References Cited in the file of this patent

UNITED STATES PATENTS 2,614,160     Foote et al. _____ Oct. 14, 1952
2,719,966     Schurr _____ Oct. 4, 1955